US009959542B2

(12) United States Patent
Benson (10) Patent No.: US 9,959,542 B2
(45) Date of Patent: *May 1, 2018

(54) SYSTEM AND METHOD FOR THE AUTOMATED PROCESSING OF PHYSICAL OBJECTS (71) Applicant: 1997 IRREVOCABLE TRUST FOR GREGORY P. BENSON, Rancho Santa Fe, CA (US)

(72) Inventor: Gregory P. Benson, Rancho Santa Fe, CA (US)

(73) Assignee: 1997 Irrevocable Trust For Gregory P. Benon, Rancho Santa Fe, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/431,556

(22) Filed: Feb. 13, 2017

(65) Prior Publication Data
US 2017/0154344 A1 Jun. 1, 2017

Related U.S. Application Data (63) Continuation of application No. 11/623,656, filed on Jan. 16, 2007, now Pat. No. 9,569,907.
(Continued)

(51) Int. Cl.
*H04L 29/06* (2006.01)
*G06F 3/06* (2006.01)
*G06Q 30/00* (2012.01)

(52) U.S. Cl.
CPC ......... *G06Q 30/0185* (2013.01); *G06F 3/065* (2013.01); *G06F 3/067* (2013.01);
(Continued)

(58) Field of Classification Search
CPC ... G06Q 30/0185; G06F 3/065; G06F 3/0619; G06F 3/067; H04L 63/0853; H04L 63/0861
(Continued)

(56) References Cited

U.S. PATENT DOCUMENTS 6,035,291 A 3/2000 Thiel
6,085,320 A 7/2000 Kaliski, Jr.
(Continued)

FOREIGN PATENT DOCUMENTS

EP 0805409 11/1997
WO WO/2000/065541 11/2000
(Continued)

OTHER PUBLICATIONS

Reading encrypted postal indicia, Cullen et al, 10.1109/ICDAR.1995.602075, IEEE, Aug. 1995 (Year: 1995).*
(Continued)

*Primary Examiner* — Jahangir Kabir
(74) *Attorney, Agent, or Firm* — Knobbe Martens Olson & Bear LLP (57) ABSTRACT

Methods and systems for verifying authenticity of a physical object and/or for verifying possession of the object by an individual are described. In one embodiment, the object is registered with a remote processing system. Data representing at least one characteristic of the object is obtained and stored in the remote system and the identity of the individual or entity possessing the object is authenticated. After authenticating the individual, an identifier is collocated (or an existing mechanism is activated or modified to replicate the identifier) with the object, where the identifier uniquely identifies the object and the individual possessing the object. The object and the identity of the individual possessing the object can be authenticated at a future time by sensing the collocated identifier and sending the sensed identifier to the remote system. The remote system can send instructions to an entity wishing to authenticate the object and its association with the individual possessing the object. The instructions can be set up at the time the object is registered in the remote system. The remote system can perform an interac-
(Continued)

tive or automated session with the entity wishing to authenticate the object, thereby saving time and providing a robust method of authentication and means for carrying out additional processing functions.

19 Claims, 5 Drawing Sheets

Related U.S. Application Data (60) Provisional application No. 60/760,731, filed on Jan. 20, 2006.

(52) U.S. Cl.
CPC ........ G06F 3/0619 (2013.01); H04L 63/0853 (2013.01); H04L 63/0861 (2013.01)

(58) Field of Classification Search
USPC ........ 713/150, 168, 176, 186; 358/400, 402; 705/400, 401
See application file for complete search history.

(56) References Cited

U.S. PATENT DOCUMENTS

| | | | |
|---|---|---|---|
| 6,091,835 A | 7/2000 | Smithies et al. | |
| 6,175,827 B1 * | 1/2001 | Cordery | G07B 17/00435 705/401 |
| 6,185,683 B1 | 2/2001 | Ginter et al. | |
| 6,189,098 B1 | 2/2001 | Kaliski, Jr. | |
| 6,539,396 B1 | 3/2003 | Bowman-Amuah | |
| 6,542,515 B1 | 4/2003 | Kumar et al. | |
| 6,550,672 B1 | 4/2003 | Tracy et al. | |
| 6,601,234 B1 | 7/2003 | Bowman-Amuah | |
| 6,609,117 B2 | 8/2003 | Sutherland et al. | |
| 6,650,761 B1 | 11/2003 | Rodriguez et al. | |
| 6,757,720 B1 | 6/2004 | Weschler, Jr. | |
| 6,786,954 B1 | 9/2004 | Lee et al. | |
| 6,789,112 B1 | 9/2004 | Freeman et al. | |
| 6,826,707 B1 | 11/2004 | Stevens | |
| 6,851,118 B1 | 2/2005 | Ismael et al. | |
| 6,987,964 B2 | 1/2006 | Obradovich et al. | |
| 7,000,115 B2 | 2/2006 | Lewis et al. | |
| 7,044,395 B1 | 5/2006 | Davis et al. | |
| 7,080,041 B2 | 7/2006 | Nagel | |
| 7,152,047 B1 | 12/2006 | Nagel | |
| 8,036,994 B2 | 10/2011 | Elliot | |
| 9,569,907 B2 | 2/2017 | Benson | |
| 9,747,576 B2 * | 8/2017 | Far-hadian | G06Q 10/083 |
| 2002/0026430 A1 | 2/2002 | Ryan, Jr. | |
| 2002/0091545 A1 | 7/2002 | Heiden et al. | |
| 2003/0035148 A1 | 2/2003 | Patton et al. | |
| 2003/0055795 A1 | 3/2003 | Sesek | |
| 2003/0084302 A1 | 5/2003 | de Jong et al. | |
| 2003/0115162 A1 | 6/2003 | Konick | |
| 2004/0049316 A1 | 3/2004 | Pintsov et al. | |
| 2004/0093312 A1 | 5/2004 | Cordery et al. | |
| 2004/0153649 A1 | 8/2004 | Rhoads | |
| 2004/0263901 A1 | 12/2004 | Critelli et al. | |
| 2005/0065898 A1 * | 3/2005 | Elliot | B07C 3/00 705/404 |
| 2005/0066172 A1 * | 3/2005 | Vorbruggen | G06F 21/64 713/176 |
| 2005/0240778 A1 | 10/2005 | Saito | |
| 2005/0263594 A1 | 12/2005 | Onischu | |
| 2006/0095391 A1 | 5/2006 | Cordery et al. | |
| 2007/0180262 A1 | 8/2007 | Benson | |
| 2010/0280903 A1 | 11/2010 | Barlin | |

FOREIGN PATENT DOCUMENTS

| | | |
|---|---|---|
| WO | WO/2001/035348 | 5/2001 |
| WO | WO/02054341 | 7/2002 |

OTHER PUBLICATIONS

Graphical indicia, Shaked et al, Image Processing, 2003, ICIP 2003. Proceedings. 2003 International Conference, IEEE, 2003.
International Search Report and Written Opinion for Application No. PCT/US2007/001116 dated Jul. 31, 2007, 12 pages.
Reading encrypted postal indicia, Cullen et al, Document Analysis and Recognition, 1995, Proceedings of the Third International Conference, IEEE 1995.

* cited by examiner

SYSTEM AND METHOD FOR THE AUTOMATED PROCESSING OF PHYSICAL OBJECTS

CROSS-REFERENCE TO RELATED APPLICATIONS

This application is a continuation of U.S. application Ser. No. 11/623,656, filed Jan. 16, 2007, which claims priority to U.S. Provisional Application No. 60/760,731, filed on Jan. 20, 2006, all of which are incorporated by reference in their entirety.

BACKGROUND OF THE INVENTION

Field of the Invention

The field of the invention relates to authentication of objects using collocated coding. More particularly, the invention relates to authentication of objects linked to an entity using collocated coding and a remote computing system.

Description of the Related Art

The dramatic introduction of computing systems over recent decades has not yet triggered the full range of benefits for processing physical objects as those achieved in the digital domain. What has been lacking in the marketplace is a means for bridging the idiosyncrasies of the physical and virtual worlds such that a single platform of standards and processes can be uniformly performed across both worlds. Dramatic improvements in the efficiency of future commerce are possible if a system for conducting trusted global commerce can be made available to all parties in the value chain regardless of the nature of the product or channel of distribution.

Determining authenticity of an object can present complex problems. A recipient of an object may not have the knowledge necessary to authenticate an object. In addition the recipient may not have the information available locally to determine the authenticity of an object. Furthermore, determining the source of a received object presents similar complex problems. Simply trusting information received with the object indicating the source may result in false conclusions or incorrect actions being taken after receiving the object. A recipient may desire further proof that the received object did in fact come from the indicated source. Thus there is a need for a way of authenticating that an individual actually possessed and had delivered a physical object while at the same time authenticating that the object, or in some embodiments, the contents (actual or virtual) of the object are actually those that the individual possessed.

SUMMARY OF THE INVENTION

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Inventive Embodiments" one will understand how the features of this invention provide advantages over other error management solutions.

An aspect provides a method including storing data representing at least one characteristic of a physical object in the possession of a first entity, and authenticating the identity of the first entity. The method further includes, subsequent to authenticating the identity of the first entity, collocating an identifier with the object that uniquely identifies the object and the first entity, receiving data representing the identifier from a second entity, electrically receiving second data representing the at least one characteristic of the physical object from the second entity, and electrically determining whether the received second data matches the stored data and whether the received identifier matches the integrated identifier.

DETAILED DESCRIPTION OF CERTAIN EMBODIMENTS

Methods and systems for verifying authenticity of a physical object and/or for verifying possession of the object by an individual are described. Embodiments provide apparatus and methods for improving detection of fraudulent documents, counterfeiting, and additionally, provide for automated, efficient processing of large volumes of physical objects through the use of instructions linked to the objects. Embodiments may dramatically improve the speed and accuracy of activities such as, for example, processing incoming mail, processing passengers at transportation hubs and processing currency transactions. Aspects of the methods and systems are applicable to digital objects such as email, computer files, and recorded video as well as exclusive objects such as jewelry or high fashion where counterfeiting has become commonplace. Skilled artisans will recognize other areas where the methods and systems discussed above can be utilized including, expiration enforcement (e.g., ID, visa), license revocation, enforcement of policies and conditional actions linked to handling certain types of objects, reminders for renewal or payment of subscriptions, inventory control, enforcement of restricted uses (e.g., areas, geography, industries, products), usage tracking, signature verification and others.

In the following description, specific details are given to provide a thorough understanding of the disclosed methods and apparatus. However, it will be understood by one of ordinary skill in the art that the disclosed methods and apparatus may be practiced without these specific details. For example, electrical components may be shown in block diagrams in order not to obscure certain aspects in unnecessary detail. In other instances, such components, other structures and techniques may be shown in detail to further explain certain aspects.

It is also noted that certain aspects may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 1:
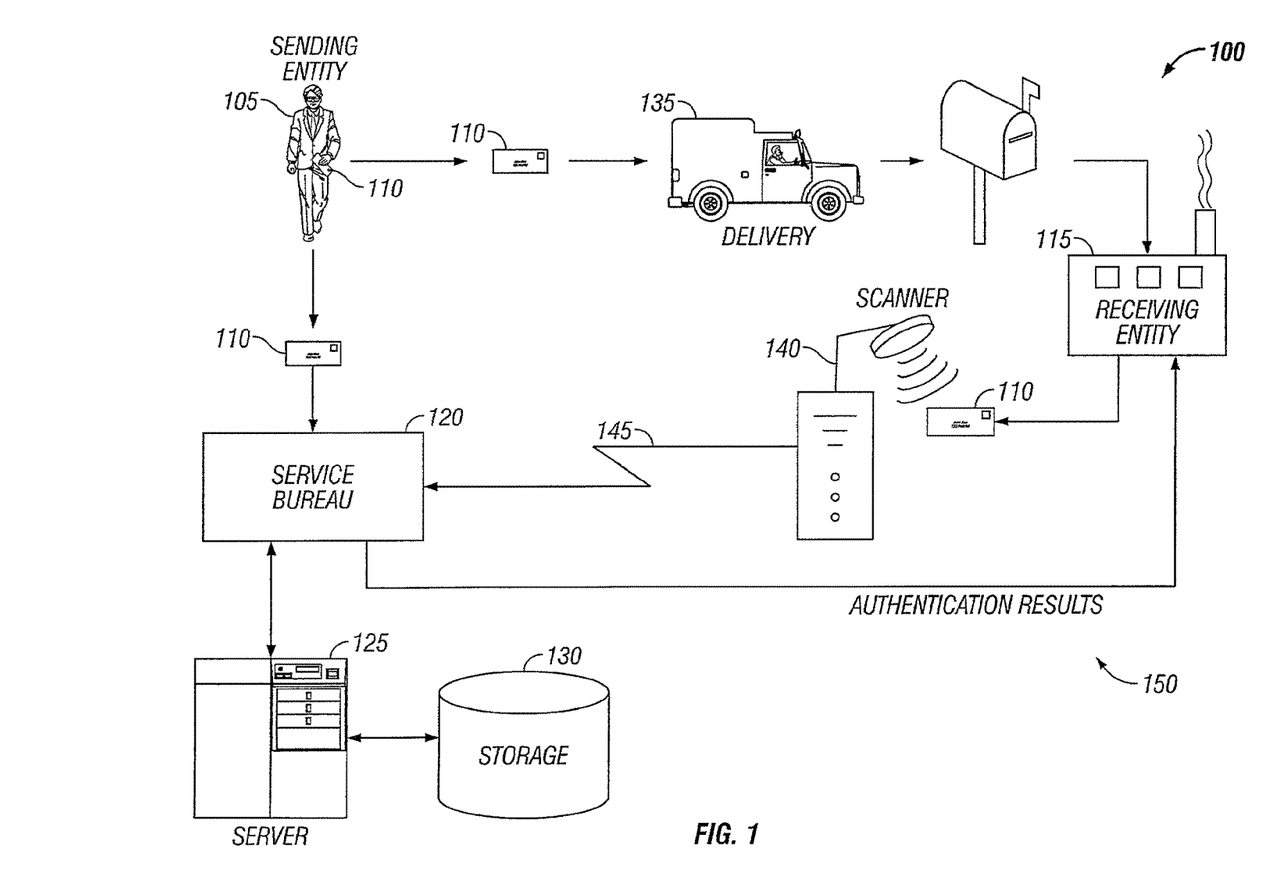
FIG. 1 is a representational block diagram of an embodiment of a system for providing authentication of delivery of an object from a first entity to a second entity.

FIG. 1 shows an embodiment of a system 100 for providing confirmation of delivery of an object 110 from a first entity 105 to a second entity 115. In one embodiment, the object 105 can be an information bearing medium such as, for example, currency, diplomas, transcripts, a driver's license, an identification card, securities (e.g., stocks, bonds, or notes), medical records, an invoice, a social security card, a passport, a visa, immigration documents, a ticket (e.g., for transportation, an event), an electronic payment wand, etc. In another embodiment, the object 105 can be any item of value such as, for example, jewelry, a watch, an automobile, a boat, an airplane, golf clubs, etc. Without loss of generality, the system 100 will be described in terms of delivering a piece of mail 110 from a sending entity 105 to a receiving entity 115.

The sending entity 105 performs a registration of the object at a service bureau 120. The service bureau 120 performs a registration process that associates an identifier code with the object and the sending entity 105. In one embodiment, the identifier is collocated with the piece of mail 110. The collocating can comprise printing the identifier on the piece of mail 110, or embedding the identifier with a portion of the piece of mail 110. The identifier may be a unique pattern of dots or bars, bio agents such as bio-luminescence, electronic circuits (e.g., RFID), radio isotopes or a combination thereof. The identifier can be scanned with one or more sensing devices that employ one or more of optical sensing, an infrared charge coupled device, an RF receiver magnetic sensors, etc. The collocating of the identifier may alternatively comprise activating or altering an embedded identifier mechanism from a latent state (e.g., activating or modifying an RFID module).

The service bureau 120 uses a server 120 for storing data linking the identifier code with the piece of mail 110 and the sending entity 105. The server 120 may be any type of computer with one or more processors and memory. The data may be stored in memory of the server or in an external storage device 130. Preferably, the stored data includes data representative of one or more characteristics of the piece of mail 110 and the identity of the sending entity 105. Details of the types of data representative of the one or more characteristics of the piece of mail 110 are discussed below in reference to FIG. 5. The registration event also includes authentication of the identity of the sending entity 105. In some embodiments, data representing the identity of the sending entity 105 is also stored on the server 125 and/or the storage device 130. The data representing the identity of the sending entity 105 may include bioinformatics information such as a fingerprint scan, or retinal scan, etc.

After the piece of mail 110 is registered and the identifier collocated on the piece of mail, a delivery service 135 (e.g., a postal service, or commercial parcel service) delivers the piece of mail 110 to the receiving entity 115. Subsequent to receiving the piece of mail 110 at the receiving entity 115, the collocated identifier on the piece of mail 110 is scanned by a scanning device 140. As discussed above, the scanning device can be an optical scanner, an RF scanner, an infrared scanner, etc. The scanned identifier is then electrically communicated to the service bureau 120 over a communication channel 145. The communication channel 145 can be one or more of a wireless or wired network. For example, the scanning device 145 may be linked with a mobile phone (wirelessly or electronically) which can communicate with the service bureau 120. The network may include any type of electronically connected group of computers including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). Note that computing devices may be desktop, server, portable, handheld, set-top, or any other desired type of configuration. As used herein, the network includes network variations such as the public Internet, a private network within the Internet, a secure network within the Internet, a private network, a public network, a value-added network, an intranet, and the like.

The communication of the scanned identifier code starts an authentication process that is performed remotely on the server 125 at the service bureau 120. The authentication process can comprise multiple steps of communicating data from the service bureau 120 to the receiving entity 115. Upon completion of the authentication process, an authentication result 150 is communicated from the service bureau 120 to the receiving entity 115. Details of examples of authentication processes are discussed below in reference to FIG. 5.

Figure 2:
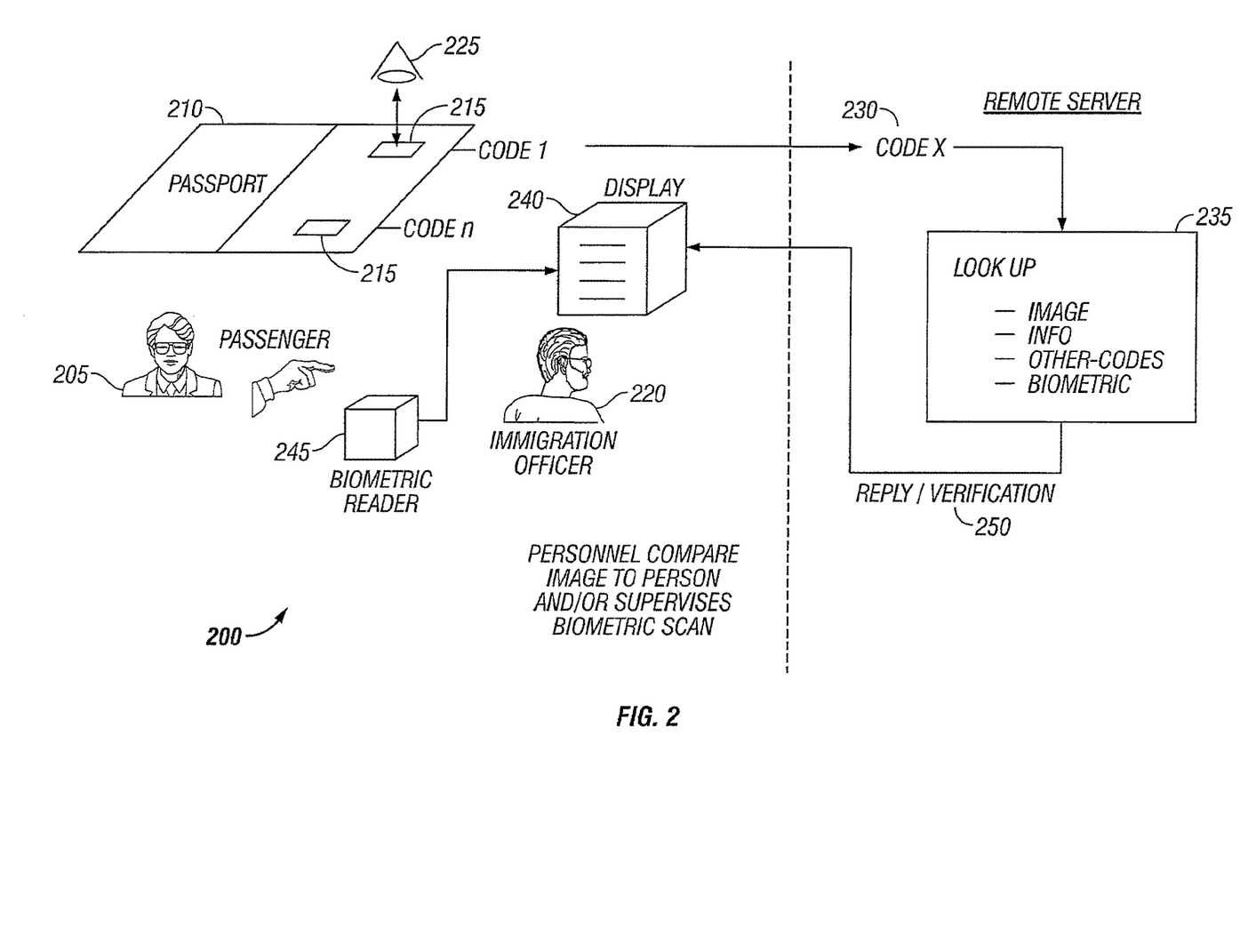
FIG. 2 is a representational block diagram of an embodiment of a system for authenticating an individual possessing a passport containing a collocated authentication code that uniquely identifies the passport and the individual.

FIG. 2 shows an illustration of a system 200 for authenticating an individual 205 possessing a passport 210 containing one or more collocated authentication codes 215 that uniquely identifies the passport 210 and the individual 205. In the example shown, the individual (e.g., a passenger) presents the passport 210 to an immigration officer 220. The immigration officer 220 scans the one or more codes 215 with a scanner 225. A scanned version of the one or more codes 215 is communicated to a remote server 235. The remote server 235 contains related data linked to the scanned codes 230. The related data may include data for authenticating the identity of the individual 205 in possession of the passport 210. Data for authenticating the individual 205 may include image data, biometric data, other collocated codes that should be on the passport 210 (if it is authentic).

In one embodiment, the related data at the server 235 includes instructions that are communicated to the immigration officer and displayed on a display device 240. The instructions may instruct the immigration officer 220 on how to proceed with the authentication of the individual 205. For example, the instructions may instruct the immigration officer 220 to position the individual 205 in front of an image capture device and the captured image can be compared to the stored image on the remote server 235 (e.g., the immigration officer may compare the images on the display 240, or the capture image may be communicated to the remote server 235 for comparison. A biometric sensor 245 may also be used in a similar manner to compare the finger prints of the individual 205 with stored finger prints on the remote server 235. The remote server 235 communicates an authentication reply 250 to the immigration officer 220. The authentication reply may be a binary pass/fail response depending on the results of the comparisons.

The systems illustrated in FIGS. 1 and 2 are examples of systems that can use a remote authentication server to authenticate an object and/or an individual associated with the object. Other scenarios will be apparent to skilled artisans. Details of methods and apparatus for performing the remote authentication of objects and individuals will now be discussed.

Figure 3:
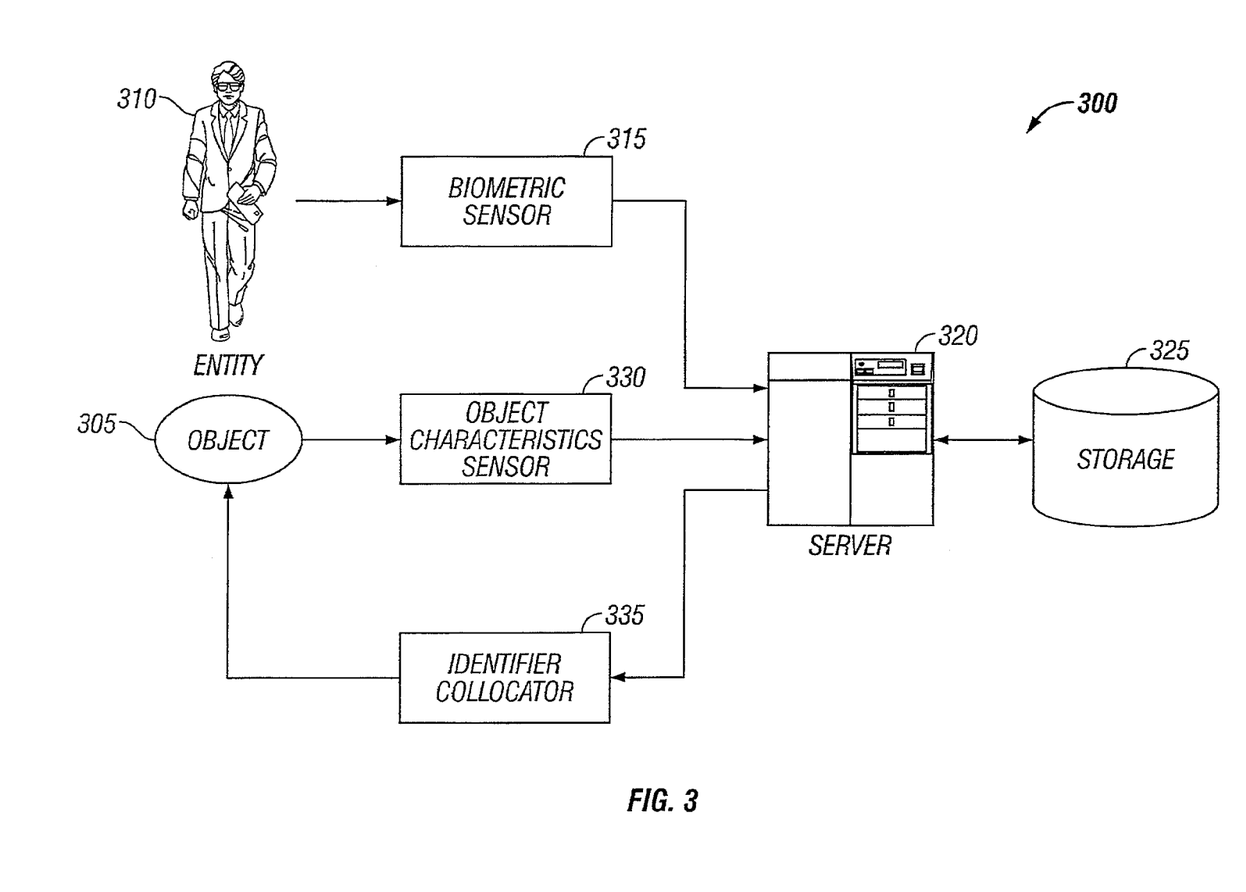
FIG. 3 is a representational block diagram of an embodiment of a system for registration of a physical object in the possession of an individual.

FIG. 3 shows an embodiment of a system 300 for registration of a physical object 305 in the possession of an entity 310. The system 300 may be at a fixed location such as the service bureau 120 in FIG. 1. The system 300 may also be a mobile system (e.g. comprising handheld or portable components) that is connected with a central server via a wireless connection (not shown). The physical object 305 may be any of the example objects discussed above. The entity 310 may be a single individual, or a group of individuals such as a corporation, club, or any other group of individuals with an affiliation of one type or another. The registration system 300 includes a sensor 315, such as a biometric sensor, for sensing one or more characteristics of the entity 310 such as fingerprints, retina scans, facial image, images of scars, etc. It should be noted, that in the case of a group of individuals, each individual in the group can be sensed individually. The data obtained with the biometric sensor 315 is received by a server 320 and stored in a memory or storage component 325.

The registration system 300 also includes an object characteristics sensor 330 for measuring or otherwise sensing one or more characteristics about the object 305. The characteristics can be data representing physical characteristics, digital content, or any other data that can be used to distinguish the object 305 for purposes of authentication. The data obtained by the object characteristics sensor 330 is also received by the server 320 and stored on the storage component 325. The server 320 generates an identifier that is linked to the data obtained from the biometric sensor 315 and the object characteristic sensor 330. The identifier may be a unique pattern of dots or bars, bio agents, electronic circuits (e.g., RFID), radio isotopes or a combination thereof. An identifier collocater element 335 collocates the unique identifier on the object 305. The identifier may be printed on the object 305, or embedded on or within the object 305. In some embodiments, the identifier may be stored electrically in the object 305. The identifier may be readily observable, such as in the case of printed dots or bars, or not readily observable in the case of RFID or magnetics.

Figure 4:
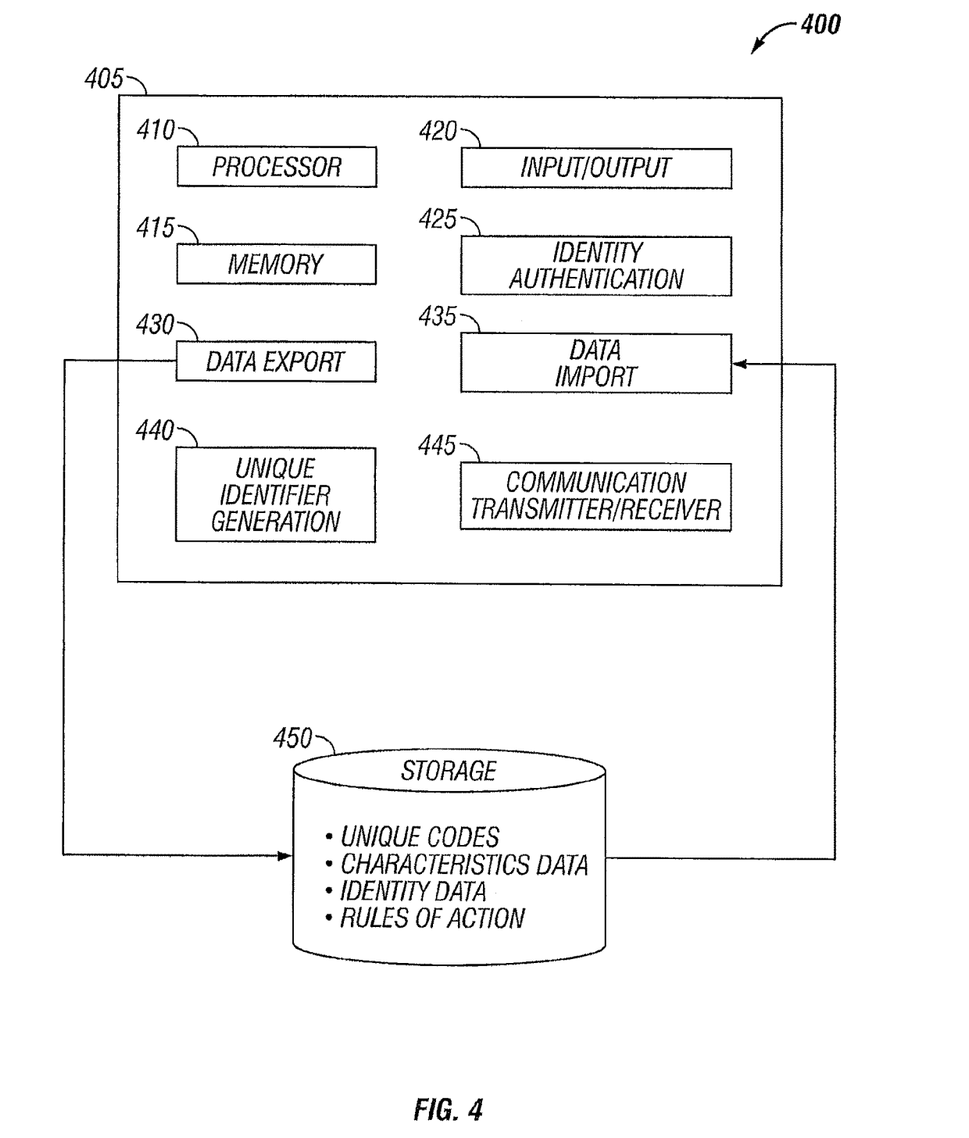
FIG. 4 is a block diagram of an embodiment of a server system that may be used in any of the systems of FIGS. 1, 2 and 3.

FIG. 4 is a block diagram of an embodiment of a server system 400 that may be used in any of the systems of FIGS. 1, 2 and 3. The server system 400 includes a server 405 and external storage 450. Embodiments of the server system 400 may be used to perform the functions the of the server 125 and storage component 130 of the system 100, the functions of the server 235 of the system 200, or the functions of the server 320 and the storage component 325 of the system 300 as discussed above.

The server 405 is comprised of various modules 420-445. As can be appreciated by one of ordinary skill in the art, each of the modules 420-445 comprise various sub-routines, procedures, definitional statements, and macros. Each of the modules 410-445 are typically separately compiled and linked into a single executable program. Therefore, the following description of each of the modules 420-445 is used for convenience to describe the functionality of the server 405. Thus, the processes that are undergone by each of the modules 420-445 may be arbitrarily redistributed to one of the other modules, combined together in a single module, or made available in a shareable dynamic link library. Further, each of the modules 420-445 could be implemented in hardware.

The embodiment of the server 405 shown in FIG. 4 includes a processor element 410, a memory element 415, an input module 420, an identity authentication module 425, a data export module 430, a data import module 435, a unique identifier generation module 440 and a communication module 445. The processor 410 may be any conventional general purpose single- or multi-chip microprocessor such as a Pentium® processor, Pentium II® processor, Pentium III® processor, Pentium IV® processor, Pentium® Pro processor, a 8051 processor, a MIPS® processor, a Power PC® processor, or an ALPHA® processor. In addition, the processor 410 may be any conventional special purpose microprocessor such as a digital signal processor. The memory element 415 may include electronic circuitry that allows information, typically computer data, to be stored and retrieved. The memory 415 can also include external devices or systems, for example, disk drives or tape drives. The memory 415 may also include fast semiconductor storage (chips), for example, Random Access Memory (RAM) or various forms of Read Only Memory (ROM), which are directly connected to the processor 410. Other types of memory include bubble memory and core memory.

The processor 410 is coupled to the memory 415 and the other modules to perform the various actions of the other modules. The input module 420 is used to parse data input to the server 405. The data may include input data obtained during registration of an object and individual as shown in FIG. 3, where biometric data and/or data representing one or more characteristics of the object are obtained. The data may also be biometric data or object data received over a network from a remote entity such as the receiving entity 115 or the immigration officer 220 in FIGS. 1 and 2 respectively. The input data is parsed and stored into memory such as the memory element 415 or the external storage 450. The data is stored in such a way that the unique code identifiers and the corresponding biometric, object characteristic, individual identity data and any predetermined instructions or rules can be linked together.

The identity authentication module 425 performs tasks associated with authenticating the identity of an individual. In one embodiment, the identity authentication module verifies the identity of an individual registering an object with an external database such as the social security administration, the FBI, etc. The verification may include matching biometric patterns such as finger prints, facial images and retina scans. In another embodiment, the identity authentication module is used to match data received from a second entity, such as the receiving entity 115 in FIG. 1 or the immigration officer 220 in FIG. 2, In this embodiment, the received data is compared to data stored in the external storage 450 to authenticate the claimed identity of an individual that is associated with a registered object. Details of other functions of the identity authentication module 425 will be discussed below in reference to FIG. 5.

The data export module 430 and the data import module 430 and 435, respectively, are configured to store/retrieve data to/from external devices such as the external storage 450. Other external databases, such as available over the Internet, may also be available to the data export module 430 and the data import module 435.

The unique identifier generation module 440 is used to generate the unique identifier codes that are associated and collocated with the registered objects to be authenticated. The identifier generation module 440 may use randomly generated codes where no two codes are identical, thus uniquely identifying an object and an entity that the object is associated with. The unique codes may also be sequential or predetermined codes, where no code in the sequence is repeated. The codes may be patterns of dots or bars, RF waveforms, magnetic waveforms, etc.

The communication module 445 is configured to transmit and/or receive data over a network such as the network 145 in FIG. 1. The transmitter and/or receiver subsystems of the communication module 445 can be configure to be used over wired and/or wireless networks. The data received may include scanned data representing a unique identifier code, biometric data, responses to instructions sent by the server to a second entity, etc. Details of functions performed by the communication module 445 will be discussed below in reference to FIG. 5.

In some embodiments, one or more of the elements of the server system 400 of FIG. 4 may be rearranged and/or combined. The elements/modules may be implemented by hardware, software, firmware, middleware, microcode or any combination thereof. Details of the actions performed by the elements/modules of the server system 400 are discussed below in reference to the methods illustrated in FIG. 5.

Figure 5:
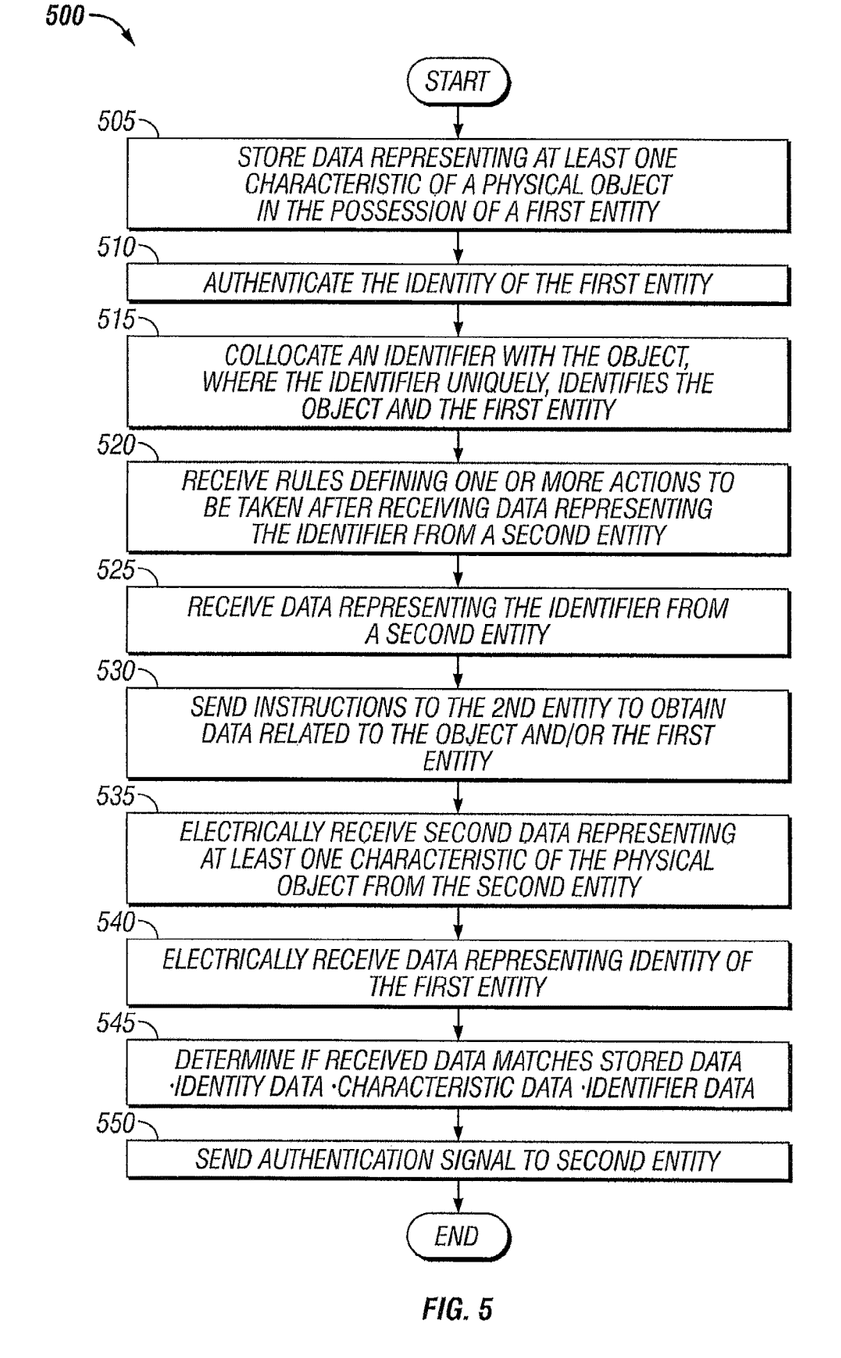
FIG. 5 is a flowchart illustrating a process of performing remote authentication of an object in the possession of an individual.

FIG. 5 is a flowchart illustrating a process of performing remote authentication of an object in the possession of an individual. Certain blocks of method 500 may be performed by the server system 400 for use in the various systems 100, 200 and 300 illustrated in FIGS. 1, 2 and 3, respectively. It should be noted, depending on the embodiment, that one or more of the blocks of the method 500 may be rearranged, combined, or omitted.

The method 500 starts at block 505 where data representing at least one characteristic of a physical object in the possession of a first entity is stored. The first entity is the person, or group of persons, as discussed above, that is in possession of or, in some embodiments, has the right to be in possession of the object. The physical object may be any physical object as discussed above. The physical object may contain textual information, printed or digital. The object may comprise a computer readable medium containing any type of digital data, including scrambled or encrypted data. The characteristic being stored may be obtained by photographing the object or measuring some other identifying feature such as weight, or radio isotope emission. In the case of information content of an object, a portion of a digital representation of the data contained in or on the object (in the case of a memory device such as a memory disc or card) can be stored. In the case of digital media, the stored characteristic may be a hash code produced by processing the digital data (or a portion of the digital data) using a one-way hash function. Any type of characteristic that can be obtained from the object and having a digital representation able to be stored can be used at the block 505.

In some embodiments, the characteristic being stored at the block 505 may not be contained in the physical object, but instead, the physical object is only a token that, upon authentication, can be used to retrieve the stored characteristic. For example, the physical object may be a postcard mailed from a company (the first entity) to an individual (the second entity) informing the individual that a digital catalog has been reserved in the individual's name. The stored characteristic in this example may be any form of content data such as a digital representation of the catalog. The type of content data can vary greatly depending on the embodiment. Content data may include any type of digital file. For example, the content data can include: a content display program, a game, an entertainment program, a utility program, entertainment data, advertisement data, music data, pictures or a movie. Furthermore, as non-limiting examples, the content data can be in any one of the following data formats: a template, a static file, a Joint Photographic Experts Group (JPEG) file, an animated GIF, a HyperText Markup Layout page, a .wav file, or a Macromedia flash file. The input/output module 420 and/or the data export module 430 in FIG. 4 may perform the functions at the block 505.

After storing the data representing the object at the block 505, the method 500 continues at block 510 where the identity of the first entity is authenticated. In one embodiment, the authentication at block 510 may comprise obtaining biometric data from the individual and matching the obtained data to data stored on a trusted database such as the FBI, NSA, etc. However, this secondary verification linking a name or other identifying number such as a social security number to a fingerprint, may not be necessary in all embodiments. For example, if the authentication system is merely to authenticate that a person A was in possession of object B at one point in time, then secondary verification of the individual biometric being previously linked with a claimed name or number may not be necessary. In these embodiments, the authentication at block 510 may simply be having proof that a person A was scanned to produce biometric data representing the person A, and the person A was in fact in possession of the object B. The identity authentication module 425 in FIG. 4 may perform the authentication functions at the block 510. The biometric sensor element 315 of the registration system 300 in FIG. 3 can obtain the data representing the identity of the first entity at the block 510.

After authenticating the identity of the first entity at the block 510, the method 500 continues at block 515, where a unique identifier is generated and collocated with the object. Collocating the identifier on the object may include electrically storing digital data on/in the object, printing a pattern on the outside of the object or concealing a printed pattern in an interior (un-viewable to the naked eye), or embedding electronic or magnetic circuitry on or within the object. The unique identifier, the authenticated identity information generated at the block 510, and the data representing the characteristic of the object stored at block 505 are all stored in memory (such as the memory 415 or the external storage 450 of the server system 400 shown in FIG. 4. Thus the collocated identifier on the object can be used to uniquely identify the object and the first entity at a later date. The unique identifier generation module 440 of the server 405 in FIG. 4 can generate the unique identifier at the block 515. The identifier collocator element 335 of the registration system 300 in FIG. 3 can perform the collocating functions at the block 515.

The blocks 505, 510 and 515 make up the registration portion of the method 500. The registration system 300 of FIG. 3 can be used to perform the registration functions of the blocks 505, 510 and 515. An optional block 520 may also be performed at time of registration where a set of rules is generated defining one or more actions to be taken during an authentication process after receiving data representing the identifier from a second entity. The action related rules may be defined in an application specific model (or script) by the individual registering the object or from another entity (for example the second entity). For example, the individual registering the object may want to be informed when a second entity receives the object and subsequently requests authentication of the object as done by the receiving entity 115 in FIG. 1. In another embodiment, the receiving entity 115 may specify the rules in advance (e.g., in a pre-registration process) for a specific class of objects that may subsequently be registered by the first entity and later delivered and received by the receiving entity 115. For example, the receiving entity may define a set of rules for handling invoices that are registered at the service bureau 120 and later received by the receiving entity 115. When the receiving entity scans the code and authenticates the received object as coming from the individual, the set of rules can provide for automatic processing of the invoice including receipt confirmation, cross checking with purchase orders, authorizing payment and scheduling the invoice for payment by the accounting system, and storing in a document archive. In another embodiment, the rules are specified by a third party, such as a law enforcement or national security agency, and instruct a second entity, such as the immigration officer 220 in FIG. 2, on what steps to take to authenticate an individual. The input/output module 420 may be used to receive the rules at the block 520.

After registration of the object, the individual, the unique identifier and the rules at the blocks 505, 510, 515 and optionally block 520, the remaining blocks of the method 500 can be used to authenticate the object and/or the individual. At block 525, data representing the unique identifier(s) collocated with the object is received. The received data is received from a second entity for purposes of authenticating the association between the individual authenticated at the block 510 and the object represented by the data stored at the block 505. The identifier data may be scanned, sensed magnetically, optically, or any number of ways depending on the type of identifier used. The data representing the identifier is received over a network as described above. The communication module 445 of the server 405 may perform the functions at the block 525.

After receiving the data representing the identifier at the block 525, the method 500 continues at optional block 530. If rules for taking one or more actions were defined at block 520, the server 405 sends instructions to the second entity to obtain data to be used in processing/authenticating the object as determined by the instructions. The instructions may instruct the second entity to make a biometric scan of the individual or to take a picture of the object, for example. In some embodiments, instructions may instruct the second entity to alter the identifier code in a predetermined way so as to further protect against fraud. For example, the collocated identifier may be an embedded RFID module emitting the identifier code. In this case the identifier code may be changed in the RFID module and on the server 405. Depending on the instructions, data related to one or more characteristics of the physical object may be received at block 535, or data representing the identity of the first entity may be received at block 540.

The rules received at the block 520 and/or the instructions sent at the block 530 may be represented in any programming language such as, for example, C, C++, BASIC, Visual Basic, Pascal, Ada, Java, HTML, XML, or FORTRAN, and executed on an operating system. C, C++, BASIC, Visual Basic, Pascal, Ada, Java, HTML, XML and FORTRAN are industry standard programming languages for which many commercial compilers can be used to create executable code, thereby making the instructions interoperable with multiple systems.

After receiving the data representing the identifier from the second entity at the block 525, and optionally sending instructions to the second entity at the block 530, the method proceeds to block 535. At block 535, data representing the at least one characteristic of the physical object stored at the block 505 is electrically received from the second entity. The data may be an image of the object or a portion of the object, a portion of textual data from the object (a digital represen-tation of printed or digital data), or a hash function resulting from processing digital data with a one way hash function as discussed above.

At optional block 540, data representing the identity of the first individual is received. In the case of object delivery authentication as illustrated in FIG. 1, the first entity that registered the object may not be available and this block may be omitted. However, data representing the first entity may also be contained in the object (digitally or physically), in which case this data could be electrically communicated. In the case of passport authentication as shown in FIG. 2, the data received at the block 540 may include images, biometric fingerprints or retinal scans, etc. The communication module 445 of the server 405 in FIG. 4 can perform the functions of the blocks 525, 530, 535 and 540.

After receiving the data representing the identifier, the characteristic of the object, and, optionally, the data representing the first entity, the method proceeds to block 545 where a determination is made as to whether or not the received data matches the stored data. The data representing the identifier is stored such that it is cross referenced with the object characteristic data and the individual identity data. Various pattern matching techniques may be used for comparing the received and stored data. An exact match may not be necessary to authenticate an object, especially in the case of biometric data. An exact match may be the success criteria for a digitally reproducible hash function. Skilled technologists will recognize numerous methods for determining whether the received data sufficiently matches the stored data.

In some embodiments, the server 405 may also perform an audit trail check of related scans, uses, and/or exchanges of the physical object at the block 545. In these embodiments, the server stores event information related to an object that may be received at the blocks 525, 535 and 540. When a new authentication event is received regarding a particular object, the server 405 can compare the newly received information with previous use information including location, time, possessing entity identity, authenticating entity identity and others, in order to identify inconsistencies in the audit trail. For example, the simultaneous, or near simultaneous, use of the same identifier in two distant locations may trigger an alert.

After determining if the received data sufficiently matches the stored data at the block 545, an authentication signal is sent to the second entity at block 550. The authentication signal may report a pass or fail criteria indicating that the individual was in possession of the object and the identifier code was collocated with the object. The authentication signal may also report success or failure of separate tests that were made.

Thus, the method 500 provides methods for improving detection of fraudulent documents, counterfeiting, and additionally, the method provides for the automated, efficient processing of large volumes of physical objects through the use of instructions linked to the objects. These methods may dramatically improve the speed and accuracy of activities such as processing incoming mail, passengers at transportation hubs and currency transactions. As discussed above, many features of the methods and systems are applicable to digital objects such as email, files, and video as well as exclusive objects such as jewelry or high fashion where counterfeiting has become commonplace. Skilled artisans will recognize other areas where the methods and systems discussed above can be utilized including, expiration enforcement (e.g., ID, visa), license revocation, enforcement of policies and conditional actions linked to handling certain types of objects, reminders for renewal or payment of subscriptions, inventory control, enforcement of restricted uses (e.g., areas, geography, industries, products), usage tracking, signature verification and others.

In order to protect from compromising privacy, most transactions and tracking may be done by anonymous codes (e.g., the unique identifiers). In some embodiments, for example a case where sufficient legal permission has been granted, law enforcement groups may be able to gain vastly improved insight into the movement and actions of an individual (not unlike the protection and use of cell phone records today). Once official permission for access has been granted (e.g., by a subpoena) an authentication code may be issued to the investigating party. This unique code provides access to all data linked to the one individual being investigated and no others. All such investigatory activity may be tracked so as to create an audit trail for future reference.

Some example embodiments employing certain blocks of the method 500 are now discussed. The first example embodiment involves merchandise movement and related tracking logistics. In this embodiment, a manufacturer (the first entity) of a product (the physical object) registers the product to be shipped to a customer (the second entity) with a registration service such as the service bureau 120 shown in FIG. 1. The data representing the registered product stored at the block 505 may include a product identification code that is collocated on the product at the block 515. In addition, data representing the transportation details, handling details and customer details may also be stored at the block 505 and linked to the unique product identification code. The authentication of the manufacturer (e.g., or a representative of the company) at the block 510, may involve verification that the identity of a person registering the product is contained on a list of authorized company representatives. A set of rules are received at the block 520 and are directed to the handling of the received product when the customer receives it. The rules may include the following:
 a. Check received goods against purchase order.
 b. Instruct receiving personnel to carry out quality control steps.
 c. Direct shipment storage to location X on shelf Y.
 d. Send receipt approval to vendor and transport company.
 e. Submit related commerce or customs documentation.
 f. Send EDI message to company's accounting system.

When the customer receives the product, the customer contacts the service bureau 120, scans the product identifier code, which is then received at the service bureau at the block 525. The customer then transmits his customer identification information and information obtained from the product including the vendor/manufacturer information and order details at the block 540 and 535 respectively. The service bureau 120 can then authenticate that the correct customer received the correct product from the correct manufacturer at the block 545 and send an authentication signal to the customer (and possibly the manufacturer) at the block 550. The set of rules may then be communicated to the customer to automate the logistics of storing, approving and documenting purchase of the product.

Another example embodiment involves currency delivery to bank branch offices and/or ATM machines. In this embodiment, a government printing office (the first entity) prints new bills (the physical object) and registers the new bills to be transferred to a bank (the second entity) for distribution in an ATM machine, for example. In this example, the system 300 shown in FIG. 3 may be used to perform the registration process and may reside at the government printing office. The data representing the registered bills stored at the block 505 may include a serial number (the unique identifier code) that is collocated on the product at the block 515, as well as a denomination amount and other attributes of the bills. In addition, data representing the transportation details, handling details and bank or ATM location details may also be stored at the block 505 and linked to the unique identifier code. The unique identifier code may be in the form of a smart chip or RFID tag embedded with the bills. The handling details may include a list of authorized persons that can transport the currency including shipping agents, transport firms, FBI and Federal Reserve agents. The authentication of the government printing office employee performing the registration at the block 510, may involve logging into the system 300 with a fingerprinting scan and secret password. A set of rules are received at the block 520 (as defined by the government printing office and/or the bank using XML or Javascript, etc.) and are directed to the handling of the bills each time an authenticated transaction takes place. The rules may include the following:
 a. Check received currency denomination against order.
 b. Instruct receiving personnel to carry out quality control steps.
 c. Direct shipment storage to location X on shelf Y in the bank vault.
 d. Send currency with certain serial numbers to ATM number NNN.
 e. Scan and alter the unique identifier code for enabling secure audit trail involving transactions.
 f. Send EDI message to central bank accounting system.
 g. Take bills out of circulation after a certain number of transactions.

When the bank receives the bills, a bank agent contacts the government printing office, scans the currency identifier code, which is then received by the system 300 at the block 525. The bank agent then transmits his bank identification information and information obtained from the bills including the denomination and serial number information and order details at the block 540 and 535 respectively. The system 300 can then authenticate that the correct bank received the correct currency at the block 545 and send an authentication signal to the bank at the block 550. The set of rules may then be communicated to the customer to automate the logistics of storing, and documenting receipt of the bills.

Another example embodiment involves an aircraft manufacturer registering an airplane with a registration service such as the service bureau 120 shown in FIG. 1. In this embodiment, the airplane manufacturer (the first entity) builds an airplane of a certain model type (the physical object) and registers the airplane to be delivered to an airline (the second entity) and provides rules used for tracking the airplane and scheduling aircraft maintenance, etc. In this example, the system 300 shown in FIG. 3 may be used to perform the registration process and may reside at a final inspection office of the aircraft manufacturer. The data representing the airplane that are stored at the block 505 may include a serial number, a model type and attributes such as number of seats, etc. A unique identifier is collocated on the airplane at the block 515. The unique identifier may be a radio transmitter that transmits a unique code that can be authenticated by air traffic controllers at any airport. In addition, data representing the transportation details, handling details (authorized persons, verification methods, and performance metrics or operating requirements) can be stored at block 505 and linked to the unique radio identification code. The authorized person's listed in the handling details may access the registration data as deemed necessary for delivery, tracking an repair of the airplane in the future. The authentication of the aircraft manufacturer employee performing the registration at the block 510, may involve logging into the system 300 with a fingerprinting scan and secret password. A set of rules are received at the block 520 (as defined by the FAA and/or the aircraft manufacturer using, for example, XML or Javascript, etc.) and are directed to the handling of the airplane each time an authenticated flight or repair takes place. The rules may include the following:

a. Check inbound flight data.
b. Schedule aircraft in landing pattern and approach.
c. Send message to ground personnel and facilities regarding aircraft identification and maintenance requirements.
d. Request ground personnel to perform authenticity and safety checks.
e. Submit related commerce or customs documentation.
f. Send EDI message to airport accounting system to assess landing and service fees to aircraft owner (e.g., an airlines).

When the airplane approaches an airport, the radio transmission serving as the unique identifier is received by airport air traffic controller system and communicated to the system 300 at the block 525. The system 300 can then authenticate that the airplane is scheduled to land at the specific airport at the specified time and send an authentication signal to the air traffic control system at the block 550. The set of rules may then be communicated to the ground crew and other airport personnel to automate the logistics of directing the airplane to the correct gate and for performing unloading and maintenance, etc.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method comprising:
storing data, sensed by a sensing device, representing at least one physical characteristic of a physical object in the possession of a sender in a storage remote from the sender and a receiver, and accessed through a network, at a service bureau, wherein the stored data includes data indicative of a time and date when the sender was in possession of the physical object, wherein the physical object is deliverable through a delivery service;
authenticating the identity of the sender by a computer, having at least one processor, at the service bureau and being in data communication with at least the remote storage;
subsequent to authenticating the identity of the sender, generating an identifier that uniquely identifies the physical object based on the at least one sensed characteristic of the physical object and identifies the sender, wherein the identifier is stored in the remote storage;
collocating the identifier with the physical object;
sending the physical object to the receiver through a delivery service, wherein the physical object is received at the receiver through the delivery service, and wherein the receiver is the addressed recipient of the sent physical object;
receiving, at the service bureau computer, first data representing the identifier from the receiver;
receiving, at the service bureau computer, second data representing the at least one characteristic of the physical object from the receiver;
comparing, at the service bureau computer, the second received data with the stored data and the received first data representing the identifier with the collocated identifier;
storing, at the service bureau computer, data representing an audit trail of event information associated with the physical object; and
generating an authentication signal, upon a successful comparison, indicative of a confirmation to the receiver that the sender was in possession of the physical object.

2. The method of claim 1, further comprising:
receiving new event information associated with the physical object; and
determining, at the service bureau computer, whether the received new event information is consistent with the stored event information.

3. The method of claim 1, wherein the comparing is performed by an entity not associated with the sender or with the receiver.

4. The method of claim 1, wherein the physical object is associated with digital content and the at least one characteristic that is stored is the associated digital content.

5. The method of claim 4, further comprising processing the digital content subsequent to determining that the received second data matches the stored data and that the received first data representing the identifier matches the collocated identifier.

6. The method of claim 1, wherein collocating the generated identifier with the physical object comprises storing digital data within the physical object, or concealing a printed pattern in an interior portion of the physical object, or embedding electronic or magnetic circuitry within the physical object.

7. The method of claim 6, wherein storing digital data comprises storing a digital link to additional data stored in the remote storage.

8. The method of claim 1, wherein collocating the identifier with the physical object comprises activating or altering an embedded identifier mechanism from a latent state.

9. The method of claim 1, further comprising:
storing data indicative of the identity of the receiver in the remote storage;
receiving, at the service bureau computer with the remote storage, third data representing the identity of the receiver; and
comparing, at the service bureau computer, the third data with the stored data indicative of the receiver.

10. The method of claim 1, wherein the sensing includes at least one of infrared sensing, radio frequency (RF) sensing, visible-spectrum optical sensing, and magnetic sensing.

11. A non-transitory computer readable medium storing computer instructions which, when executed, cause a service bureau processor to:
request a sensing device to sense at least one physical characteristic of a physical object while the physical object is in the possession of a sender of the physical object, which is deliverable through a delivery service;
store data representing the at least one sensed characteristic in a service bureau storage remote from the sender and a receiver, wherein the remote storage is accessed through a network, and wherein the receiver is the addressed recipient of the deliverable physical object;

authenticate the identity of the sender;

generate an identifier that uniquely identifies the physical object and the sender subsequent to authenticating the identity of the sender, wherein the identifier is at least based on the at least one sensed characteristic of the physical object, wherein the identifier is stored in the remote storage;

collocate the generated identifier with the physical object;

receive first data representing the identifier from the receiver;

request sensing of the at least one characteristic of the physical object, the sensing to be performed at the receiver;

receive, at the service bureau processor, second data representing the at least one characteristic of the physical object from the receiver;

compare the second received data with the stored data and the received first data representing the identifier with the collocated identifier; and generate an authentication signal, upon a successful comparison, indicative of a confirmation to the receiver that the sender was in possession of the physical object.

12. The computer readable medium of claim 11, wherein the stored data is indicative of a time when the sender was in possession of the physical object.

13. The computer readable medium of claim 11, wherein the sensing includes at least one of infrared sensing, radio frequency (RF) sensing, visible-spectrum optical sensing, and magnetic sensing.

14. A non-transitory computer readable medium storing computer instructions which, when executed, cause a service bureau processor to:

request a sensing device to sense at least one physical characteristic of a physical object while the physical object is in the possession of a sender of the physical object, which is deliverable through a delivery service;

store data representing the at least one sensed characteristic in a service bureau storage remote from the sender and a receiver, wherein the stored data includes data indicative of a time when the sender was in possession of the physical object, wherein the remote storage is accessed through a network, and wherein the receiver is the addressed recipient of the deliverable physical object;

authenticate the identity of the sender;

generate an identifier that uniquely identifies the physical object and the sender subsequent to authenticating the identity of the sender, wherein the identifier is at least based on the at least one sensed characteristic of the physical object, wherein the identifier is stored in the remote storage;

collocate the generated identifier with the physical object;

receive first data representing the identifier from the receiver;

request sensing of the at least one characteristic of the physical object, the sensing to be performed at the receiver;

receive at the service bureau processor second data representing the at least one characteristic of the physical object from the receiver;

compare the second received data with the stored data and the received first data representing the identifier with the collocated identifier; and generate an authentication signal, upon a successful comparison, indicative of a confirmation to the receiver that the sender was in possession of the physical object.

15. The computer readable medium of claim 14, wherein the physical object is associated with digital content and the at least one characteristic that is stored is the associated digital content, and wherein the stored computer instructions further cause the service bureau processor to process the digital content subsequent to determining that the received second data matches the stored data and that the received first data representing the identifier matches the collocated identifier.

16. The computer readable medium of claim 14, wherein collocating the generated identifier with the physical object comprises storing digital data within the physical object, or concealing a printed pattern in an interior portion of the physical object, or embedding electronic or magnetic circuitry within the physical object.

17. The computer readable medium of claim 14, wherein collocating the identifier with the physical object comprises activating or altering an embedded identifier mechanism from a latent state.

18. The computer readable medium of claim 14, wherein the stored computer instructions further cause the service bureau processor to:

store data representing an audit trail of event information associated with the physical object;

receive new event information associated with the physical object; and determine whether the received new event information is consistent with the stored event information.

19. The computer readable medium of claim 14, wherein the stored computer instructions further cause the service bureau processor to:

store data indicative of the identity of the receiver in the remote storage;

receive, at the service bureau computer with the remote storage, third data representing the identity of the receiver; and compare, at the service bureau computer, the third data with the stored data indicative of the receiver.

* * * * *